Patented Aug. 15, 1933

1,922,272

UNITED STATES PATENT OFFICE 1,922,272

AIR DRYING COMPOSITION

Howard L. Bender, Bloomfield, N. J., assignor to Bakelite Corporation, New York, N. Y., a Corporation of Delaware No Drawing. Application October 8, 1932
Serial No. 636,955

4 Claims. (Cl. 134—26)

This invention relates to synthetic resinous compositions that are primarily intended for use as coatings or impregnations and have the property of drying in air to commercially usable films for the protection of structural parts, car bodies, implements, etc., from atmospheric effects, where the conditions of use or application are such that an after-heating or baking of the films is impractical or impossible.

The synthetic resinous compositions with which this invention is concerned are differentiated from natural or other resins by an initial or potentially reactive or soluble and fusible A stage and gradually convertible or hardenable by heat to a final infusible insoluble or C stage. These resinous compositions include the phenolic aldehyde, the glycerol-polybasic and the urea or sulfo-urea-altehyde products; and to distinguish them from the permanently fusible soluble resins, the term resinoid has been adopted and is so used herein.

If these resinoids are taken while still in their soluble or reactive A condition and dissolved in volatile solvent, coatings can be made by evaporation of thin layers of the solution; such coatings, however, are not sufficiently hard and tough to withstand commercial requirements and it is necessary to bake or after-heat to advance them toward the polymerized or the infusible C condition in order to make them commercially satisfactory. To obviate the baking or afterheating, it has been proposed to make resinoids soluble in drying oils by heating the resinoids with a blending or solubilizing agent at high temperatures and thereupon incorporating a drying oil such as tung oil or linseed oil; varnishes so prepared, however, depend upon the relatively slow oxidation of the drying oil to yield a film. It has been further proposed to use a blending agent in conjunction with a reaction product of tung oil and a phenol made potentially reactive by the addition of a hardening agent in order to yield an air drying varnish composition.

In accordance with the present invention compositions of the resinoid type suitable for the uses herein contemplated can be prepared without the need of blending agent, and moreover they are not limited to oleo-resinous mixtures or combinations. Varnishes prepared therefrom deposit films or coatings which, upon evaporation of the volatile content, are non-tacky, adhere firmly to the base material and have a pleasing homogeneous translucent appearance; furthermore, the films or coatings show a marked resistance to sunlight, water penetration and weak alkaline or soap solutions. An additional characteristic of these varnishes and of manifest importance is the comparative ready release of sufficient solvents from the film forming body with the consequence that a film dries to a non-tacky condition in a surprisingly short period of time.

In order that the present invention may be fully disclosed, specific examples relating to the preparation of varnishes follow, but it is to be understood that the conditions and proportions are illustrative only and are subject to change commensurate in scope with the appended claims.

*Example 1.*—A resinoid composition is prepared in the usual manner by condensation of 1000 gms of phenol with 1000 gms of a 40 per cent solution of formaldehyde, 1 gm of hexamethylenetetramine being added as a catalyst. As the reaction proceeds, separation into oily and aqueous constituents follows; and the aqueous content can be removed by distillation, or a part can be removed by decantation and the remainder by boiling or distillation under ordinary or reduced pressure. This heating to effect dehydration is continued together with efficient agitation, preferably not only until a sample hardens upon cooling to room temperature, which is generally regarded as determinative of the solid fusible and soluble reactive A condition, but substantially to such a point that part of the mass has been transformed beyond the fusible A stage. Even though the mass as a whole remains fusible a transformation in part beyond this stage is indicated when by subjecting the cold hard resin to a cold solvent such as alcohol the lumps instead of going into solution become white due to a partial surface solution only. The heating of the mass can be further continued until cooled test samples refuse to dissolve in hot 95% alcohol and leave flakes of undissolved matter therein. When this stage is reached the mass is in a condition ready to "kick over" or transform into a porous rubbery slag-like product that is substantially insoluble and infusible if the reaction is not promptly arrested. It is not essential that this "kick over" stage be reached, but by causing the initial reaction to proceed to the extent indicated a subsequent hardening or polymerizing reaction toward a C stage is shortened very materially. Nor is it essential that the raw ingredients be used as starting materials; a reactive A resinoid commercially obtainable can be substituted and preliminarily heated to correspond to the product obtained at this stage.

When the heated mass is in the desired and still molten condition, relatively cold solvents are poured in and quickly stirred to lower the temperature of the mass and thus check the initial reaction. Solvents of a volatile nature having boiling points above 100° C. are preferred, such as butyl alcohol, amyl acetate or mixtures thereof, and the amount used is controlled by the viscosity desired in the resulting solution or suspension in solvents; a mixture of about 400 gms of butyl alcohol and about 400 gms of amyl acetate with a boiling point around 117° C. is found satisfactory for the above mentioned batch. The solution, which is not necessarily a true solution, is again heated or boiled under a reflux for a time depending upon the solvents used; with the above specific mixture the period is about 12 hours. This relatively long period of heating in the presence of the solvents results in a substantial advancement of the contained resinoid toward a hardened or polymerized condition or C stage while suspended in the solvents, and is indicated by the increasing viscosity of the solution. The solution is then poured or suspended in low boiling solvents selected with a view to the character of varnish desired; for example, acetone, alcohol, toluene, ethyl acetate, etc., or their mixtures constitute suitable volatile solvents for a brushing varnish. The resinoid can still be further advanced or brought nearer ultimate polymerization by again heating under a reflux in the presence of these solvents. Advancement can be hastened by using pressure.

Solvents can be included initially with the raw resinoid ingredients and the initial condensation as well as the hardening can be carried on in their presence. But the cost of solvents is an important item in a commercial operation; and their omission from the initial stage of the reaction with the avoidance of losses through evaporation, is therefore of practical value.

The degree or extent of advancement of the resinoid while in solution that is found desirable, has no well defined critical limits, except that the mass as a whole must not be caused to gel or "liver." Should this undesirable change of phase occur mechanical breakdown by means such as colloid mills becomes necessary to secure dispersion in solvents; mechanical means of this character are avoided by the present process. The film characteristics of toughness and durability improve correspondingly with increasing change beyond the A stage up to the point of gel formation. A usual test for determining the advancement of the resinoid is applying a coating to a selected paper and noting the degree of penetration; for example, a slight or no penetration of the solution suspended in an equal weight of alcohol (which solution is characterized, when adjusted to a 50% solid content basis for example, by a viscosity of not less than 500 centipoises at room temperature) and applied to kraft paper of five mils thickness indicates an advancement sufficient to yield air drying varnishes that are satisfactory for the uses herein mentioned. Since a resinoid in the reacted or advanced C condition is insoluble for all practical purposes, the advancement of the resinoid in solvents results largely in a colloidal suspension or dispersion, the extent of which is manifested by the lack of paper penetration. This colloidal condition is further evidenced by the fact that, although the solvent and the contained resinoid when sufficiently advanced by heating, have the appearance of a true solution, further additions of the same solvent result in a precipitation of the resinoid.

While this invention is not limited as to the solvents which can be used, it is particularly adapted to the use and inclusion of high boiling solvents which remain in the final product, and such solvents and plasticizers can therefore be chosen as will impart plasticity and flexibility or other desirable qualities to the film or coating, as well as render possible the advancement of the resinoid therein. A list of solvents for this purpose includes most of the well-known plasticizers as the esters, diamyl-phthalate, ethyl abietate, etc., as well as many other compounds not generally classed as plasticizers as oils, fatty acids, etc; in fact any of the known non-resinous solvents are suitble for the purpose.

*Example 2.*—A complex oil-phenolic resinoid composition is likewise susceptible to an advancement in solvents that gives an air-drying varnish without the requirement of a blending agent. For instance, about 100 gms of phenol are reacted with about 50 gms of tung oil (or other suitable fatty oil), either raw or so-called boiled containing metallic driers may be used, in the presence of about 1 gm of phosphoric acid or other suitable catalyst for about one-half to six hours resulting in a complex-phenolic body as described by Byck; the proportion of oil can, however, be varied within wide limits. To this mass is added about 20 to 25 gms of hexamethylenetetramine or other suitable hardening agent, together with about 40 gms of amyl acetate and 40 gms of butyl alcohol, and the whole reacted for about 50 minutes. Further additions of solvents, made up for instance of 100 gms of butyl alcohol and 100 gms of turpentine, are then provided and the varnish is heated for about 16 hours to secure the requisite advancement of the resinoid toward the C stage in the solvents.

The partly reacted or advanced resinoids contained in the varnishes obtained in accordance with the foregoing examples do not constitute the whole of the resinoid content, and in this respect the films deposited thereby may not possess the hardness, resistance to solvents, etc., as do resinoid films which have been reacted and hardened or polymerized by after-baking. But a material portion is so advanced and reacted that a dried film of the varnish is only slowly attacked by solvents such as alcohol. In this respect therefore such films or coatings are sharply differentiated from spar varnish (consisting of a rosin ester and tung oil) and similar varnish films which are readily attacked and dissolved by alcohols, and in general they are furthermore superior in their resistance to water penetration. In other respects, durability, hardness, etc., the resinoid films deposited by varnishes made in accordance with this invention, measure and compare favorably with those obtained with varnishes containing natural resins, ester gums, etc.

By the present invention furthermore a clear liquid solution is obtainable that has both technical and commercial advantages over a creamy suspension such as is secured by mechanically breaking down or dispersing in a liquid a resinoid that has been previously advanced by heating to an insoluble or lyophobe condition. From the standpoint of factory practice, there is avoided the apparatus necessary for causing the suspension as well as the process steps involved; from the standpoint of use the clear solution lends itself to admixtures and applications not as readily achieved with the suspension while it contains the solids in a much higher order of dispersion. In substance, the resinoid in the clear solution may be said to be characterized by a lyophile condition in contrast to the lyophobe condition of the mechanically suspended resinoid whereby there is obtained the properties occurring from a clear solution and in addition the properties of non-penetrativeness, etc. associated with the suspension.

This is a continuation-in-part of application Serial No. 342,309 filed February 23, 1929.

I claim:

1. Process of preparing air-drying coating compositions which comprises condensing a phenol with a reactive methylene-containing agent in proportions to yield a resinoid, dehydrating the mass under the continued application of heat to a condition approaching transformation to an insoluble state, arresting the reaction by the addition of relatively cold solvent boiling above 100° C., heating the solution to advance the resinoid therein, and adding a relatively low-boiling solvent thereto to yield a clear solution containing the resinoid in a state of advancement characterized by substantial non-penetrativeness.

2. Process of preparing coating compositions which comprises forming a resinoid of the heat-hardenable phenolic type in a soluble fusible state but in a state of advancement approaching transformation to an insoluble state, arresting the reaction by the addition of solvent and thereafter continuing the advancement in the presence of the solvent to a state yielding an air drying clear solution characterized by substantial non-penetrativeness of the resinoid ingredient and by the liquid state.

3. Process of preparing coating compositions which comprises dissolving a resinoid of the heat-hardenable phenolic type in a solvent and thereafter heating the solution to a state yielding a clear air-drying solution characterized by substantial non-penetrativeness of the resinoid ingredient and by the liquid state.

4. A liquid air-drying coating composition comprising a phenolic resinoid and a solvent as produced by the process of claim 3.

HOWARD L. BENDER.